US010023093B2

(12) United States Patent
Banjo et al.

(10) Patent No.: US 10,023,093 B2
(45) Date of Patent: Jul. 17, 2018

(54) POWER EQUIPMENT SHIPPING

(71) Applicant: Frictionless World LLC, Westminster, CO (US)

(72) Inventors: Daniel Banjo, Boulder, CO (US); Benjamin Zywicki, Louisville, CO (US)

(73) Assignee: Frictionless World LLC, Westminster, CO (US)

(*) Notice: Subject to any disclaimer, the term of this patent is extended or adjusted under 35 U.S.C. 154(b) by 0 days.

(21) Appl. No.: 15/430,201

(22) Filed: Feb. 10, 2017

(65) Prior Publication Data
US 2017/0210271 A1 Jul. 27, 2017

Related U.S. Application Data

(63) Continuation of application No. 15/346,944, filed on Nov. 9, 2016.

(60) Provisional application No. 62/281,665, filed on Jan. 21, 2016.

(51) Int. Cl.
B27L 7/00 (2006.01)
B60P 3/00 (2006.01)
B65D 88/12 (2006.01)
B62D 63/06 (2006.01)

(52) U.S. Cl.
CPC .............. B60P 3/00 (2013.01); B27L 7/00 (2013.01); B62D 63/061 (2013.01); B62D 63/062 (2013.01); B65D 88/12 (2013.01)

(58) Field of Classification Search
CPC ..... B27L 7/00; B27L 7/06; B27L 7/08; B65D 19/0002; B65D 19/0004; B65D 19/0006; B65D 19/003; B65D 25/22
See application file for complete search history.

(56) References Cited

U.S. PATENT DOCUMENTS

| 4,800,937 | A | * | 1/1989 | Mangus, Sr. | ............. | B27L 7/06 144/190 |
| 6,749,178 | B1 | * | 6/2004 | Loughner | ................. | B27L 7/00 144/193.1 |
| 7,556,072 | B2 | * | 7/2009 | Koch, Jr. | .................. | B27L 7/00 144/193.2 |
| 7,814,945 | B2 | * | 10/2010 | Babcock | .................. | B27L 7/00 144/193.2 |
| 9,162,814 | B2 | * | 10/2015 | Gronholm | .......... | B65D 19/0095 |

(Continued)

OTHER PUBLICATIONS

Training Wheels, Forklift Training—How to put a pallet away— Part 6/6, May 22, 2014, https://www.youtube.com/watch?v=SZrUx7VfU3U&t=57s.*

(Continued)

*Primary Examiner* — Matthew G Katcoff
(74) *Attorney, Agent, or Firm* — Marsh Fischmann & Breyfogle LLP; Jonathon A. Szumny

(57) ABSTRACT

Utilities (e.g., apparatuses, systems, methods, etc.) for use in loading power equipment such as log splitting apparatuses onto cargo trailers or the like in manners that increase the number of assembled log splitting apparatuses that can be loaded onto the cargo trailers (or otherwise result in more efficient loading of assembled log splitting apparatuses onto the cargo trailers) while facilitating assembled presentation of the log splitting apparatuses after unloading from the cargo trailer.

24 Claims, 13 Drawing Sheets

(56) References Cited

U.S. PATENT DOCUMENTS

| | | | |
|---|---|---|---|
| 2013/0276677 A1* | 10/2013 | Kokatsu | B65D 19/0004 |
| | | | 108/55.5 |
| 2014/0033956 A1* | 2/2014 | Kelly | B62B 3/005 |
| | | | 108/50.11 |
| 2014/0124097 A1* | 5/2014 | Banjo | B27L 7/00 |
| | | | 144/193.1 |
| 2015/0368078 A1* | 12/2015 | Hess | B65G 1/00 |
| | | | 700/217 |

OTHER PUBLICATIONS

Training Wheels, Forklift Training—How to lift a load—Part 5/6, May 21, 2014, https://www.youtube.com/watch?v=O8oDhMGnZLU.*

* cited by examiner

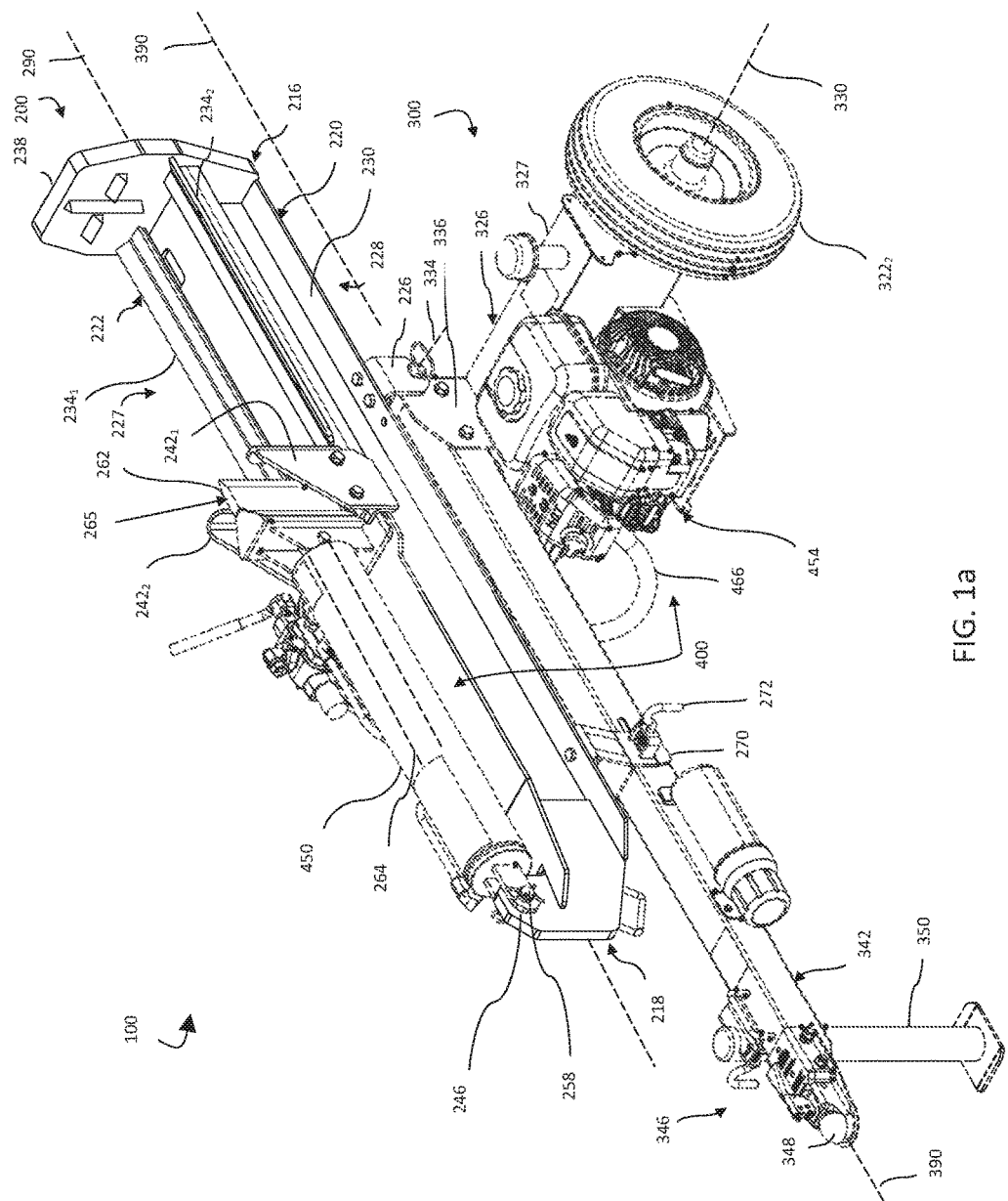

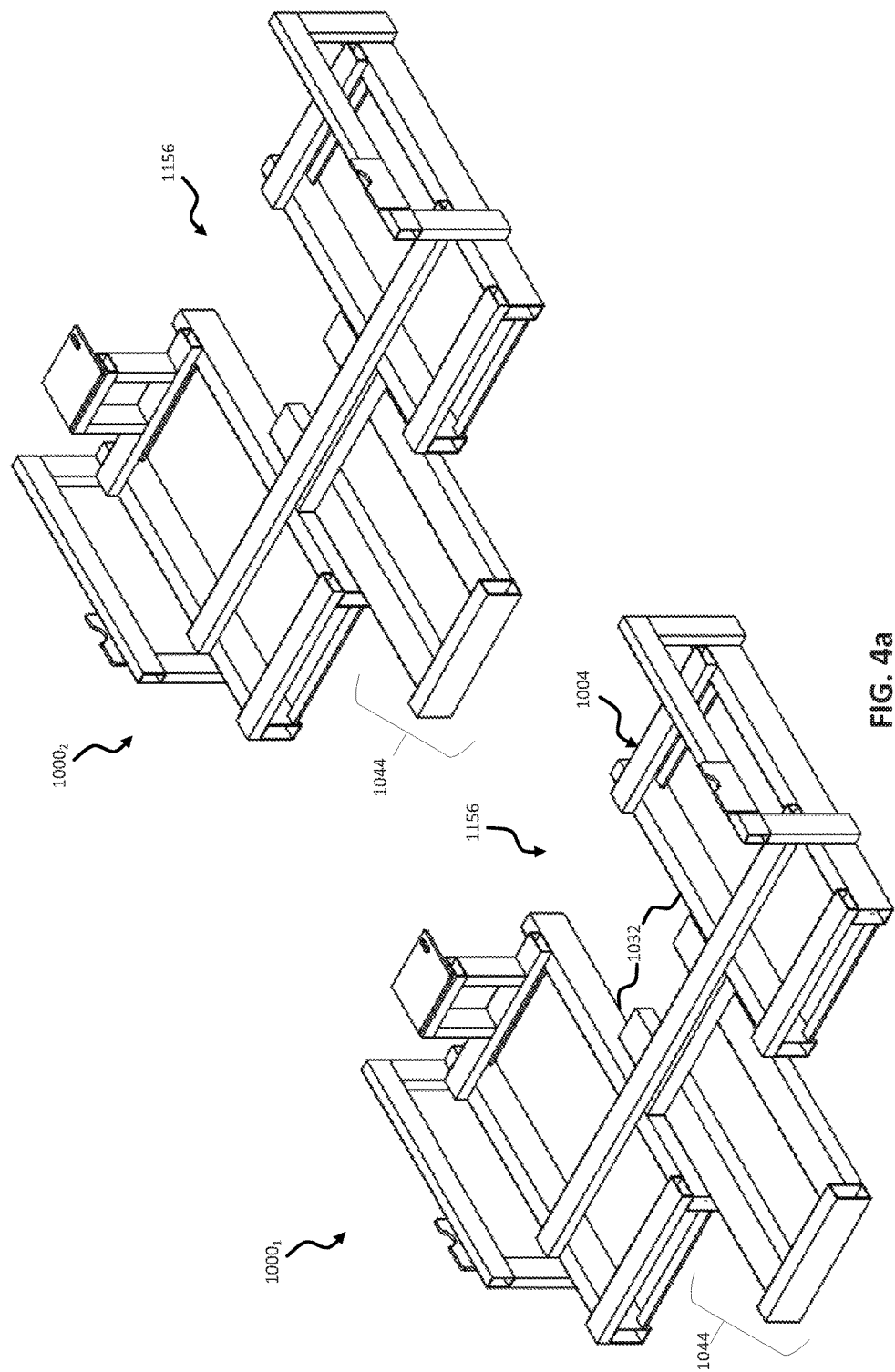

POWER EQUIPMENT SHIPPING

CROSS REFERENCE TO RELATED APPLICATIONS

This application is a continuation of U.S. patent application Ser. No. 15/346,944, entitled "POWER EQUIPMENT SHIPPING," and filed on Nov. 9, 2016, which claims priority from U.S. Pat. App. No. 62/281,665, entitled "POWER EQUIPMENT SHIPPING," and filed on Jan. 21, 2016, the entire contents of which are incorporated herein as if set forth in full.

FIELD

The present invention relates to a power equipment and, more particularly, to the shipping of power equipment.

BACKGROUND

Machines such as power tools and equipment are used all over the world to perform tasks that cannot be performed with or at least would be performed more inefficiently with a user's hands. For instance, the continued popularity of wood as a source of heat has led to increasing use of powered apparatus for wood splitting purposes. Many different forms of mechanical wood splitters have been developed. The most common design involves a frame mounted blade and platform arrangement wherein the blade, platform or both are driven toward and away from one another usually by a hydraulic cylinder. A wood block is placed between the blade and platform and the cylinder is activated to move the platform and blade together relative to one another thereby driving the blade through the wood block.

SUMMARY

Machinery and power equipment are often shipped to retailers and consumers in a substantially unassembled state and are then required to be assembled by the retailer or consumer. In the case of power equipment such log splitters, for instance, the various parts of the log splitters are packaged into shipping containers (e.g., wooden boxes, crates, etc.) by a manufacturer or producer and then loaded onto a cargo trailer (e.g., semi-trailer) or the like for eventual shipment to the retailer. Once the unassembled log splitters are unloaded at a particular retailer, the retailer must coordinate opening of the containers, assembly of each log splitter, and movement of the assembled log splitter onto the retail floor or other location for viewing and purchase by customers.

One concern with shipping power equipment and machinery in a substantially unassembled state to retailers is difficulties in assembling the power equipment and moving the assembled power equipment onto the retail floor or other location for display for consumers. In some situations, a particular retailer may not happen to employ any workers that are specifically trained or have the necessary background necessary to assemble the particular type of power equipment. As another example, a retailer may employ workers with the necessary expertise to assemble the power equipment but may assign the workers to other projects or tasks in the store, or may not have the tools necessary to assemble the power equipment. Regardless of the particular reason, failure of the retailer to open and assemble the unassembled power equipment is lost revenue for the producer and the retailer, wasted storage space, deterioration of the power equipment, and the like.

In view of the foregoing, disclosed herein are various utilities (e.g., apparatuses, systems, methods, etc.) for use in loading power equipment onto cargo trailers or the like in manners that increase the amount of power equipment that can be loaded onto the trailers and subsequently shipped while facilitating assembled presentation of power equipment to consumers. More particularly, disclosed herein are utilities that facilitate the loading of power equipment in a substantially fully assembled state into a cargo trailer or other container, increase the quantity of power equipment that can be loaded onto the cargo trailer in the substantially fully assembled state, and facilitate assembled presentation of the power equipment after unloading of the power equipment from the trailer at the retailer. The disclosed utilities advantageously reduce the effort, cost and time required to position assembled power equipment on the retail floor or other desired location for presentation to consumers resulting in increased revenue for the producer and retailer, reduced deterioration of the power equipment, and the like.

Any of the embodiments, arrangements, and the like discussed herein may be used (either alone or in combination with other embodiments, arrangement, and the like) with any of the disclosed aspects. Any feature disclosed herein that is intended to be limited to a "singular" context or the like will be clearly set forth herein by terms such as "only," "single," "limited to," or the like. Merely introducing a feature in accordance with commonly accepted antecedent basis practice does not limit the corresponding feature to the. Moreover, any failure to use phrases such as "at least one" also does not limit the corresponding feature to the singular. Use of the phrase "generally," "at least generally," "substantially," "at least substantially" or the like in relation to a particular feature encompasses the corresponding characteristic and insubstantial variations thereof. Finally, a reference of a feature in conjunction with the phrase "in one embodiment" or the like does not limit the use of the feature to a single embodiment.

Reference will now be made to the following drawings which assist in illustrating the various pertinent features of the various novel aspects of the present disclosure.

BRIEF DESCRIPTION OF THE DRAWINGS

FIG. 1a is a perspective view of a log splitting apparatus according to one embodiment including a log splitter frame in a first orientation relative to a trailer of the apparatus.

FIG. 4a is a perspective view of first and second of the support bases of FIG. 2 being spaced from each other.

FIG. 6b is a perspective view of a transport enclosure having a second plurality of support bases and respective log splitting apparatuses disposed therein greater than the first plurality illustrated in FIG. 6a.

DETAILED DESCRIPTION

Before discussing the packaging and shipping utilities disclosed herein in more detail, it may be useful to disclose one representative type of power equipment with which the utilities may be used. It is to be understood, however, that the disclosed utilities may be utilized in conjunction with other forms and types of power equipment.

Figure 1B:
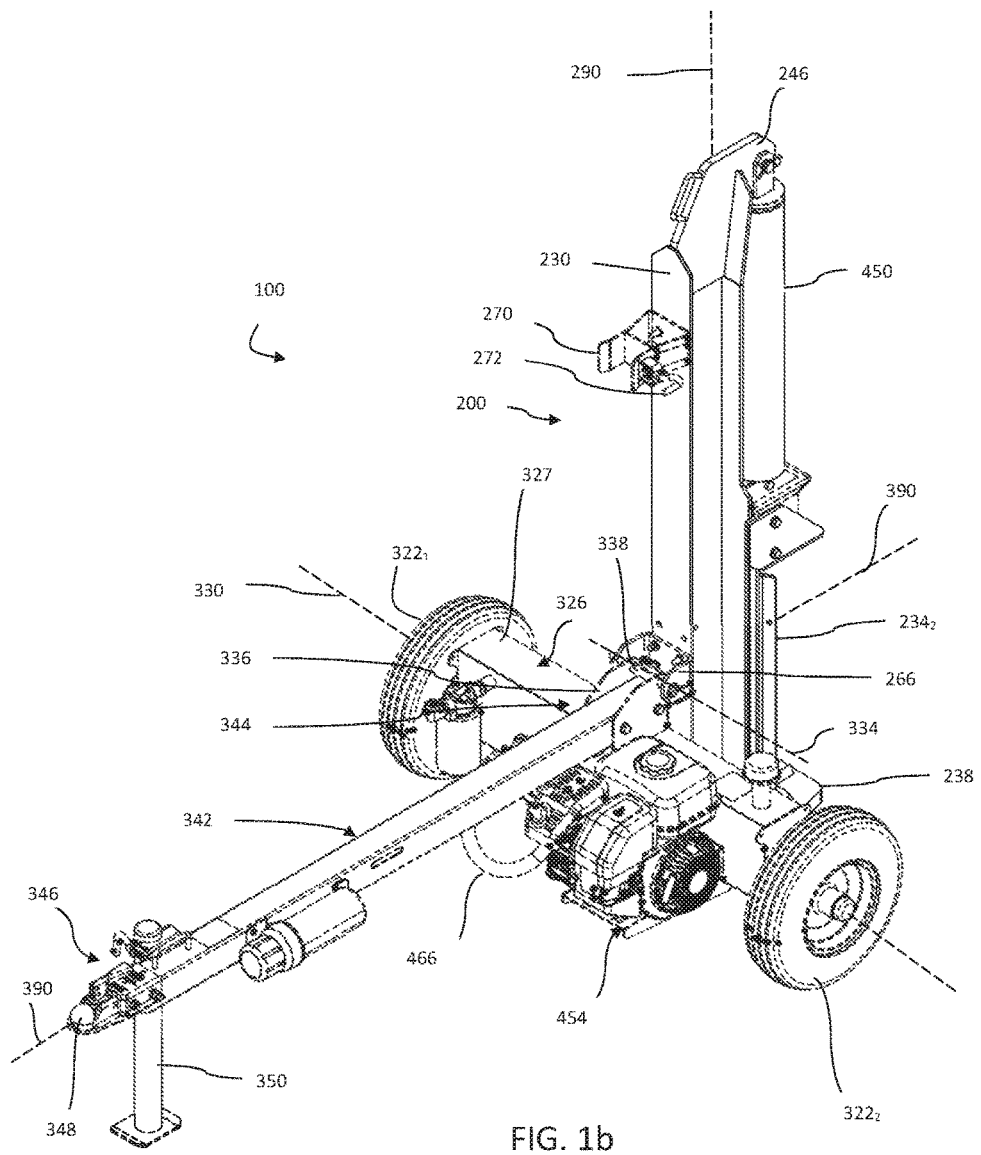
FIG. 1b is a perspective view similar to FIG. 1a but with the log splitter frame in a different orientation relative to the trailer.

In this regard, FIGS. 1a-1b illustrate perspective views of a log splitting apparatus 100 according to one embodiment. Broadly, the log splitting apparatus 100 includes a log splitter frame 200 that includes a support beam 230 (e.g., I-beam or beams of other cross-sections) having opposite first and second ends 216, 218, opposite first and second side portions 220, 222, opposite upper and lower portions 227, 228, and a longitudinal axis 290 extending along a length of the support beam 230 between the first and second opposite ends 216, 218. The log splitting apparatus 100 also includes a trailer (e.g., carriage) 300 to which the log splitter frame 200 is secured (e.g., rigidly or non-movably, pivotally, etc.) and that facilitates transport of the log splitter frame 200.

A splitting assembly 265 is linearly translatable along a translation axis (not shown, but parallel to the longitudinal axis 290) over the upper portion 227 towards and away from a stop member 238 that is rigidly or non-movably attached to and extending away from the upper portion 227 of the support beam 230 for splitting a log received over the upper portion 227. In one arrangement, the splitting assembly 265 may be in the form of a driven member 262 and a piston 264 connected to the driven member 262. The log splitting apparatus 100 may include any appropriate drive assembly 400 that is configured to drive the piston 264 and the driven member 262 along the translation axis for splitting logs received over the upper portion 227.

For instance, the driven member 262 may be in the form of a blade (e.g., two-way or four-way blade) and the stop member 238 may be in the form of a foot plate (e.g., substantially flat plate including any appropriate gripping members extending therefrom or the like) or vice versa. While the stop member 238 is illustrated as generally being positioned adjacent the first end 216 of the support beam 230, the stop member 238 may in other arrangements be positioned inwardly from the first end 216. In one embodiment, the log splitter frame 200 may include first and second cradle members $234_1$, $234_2$ appropriately secured or securable to the support beam 230 adjacent the upper portion and the first and second side portions 220, 222 that collectively form a cradle for supporting at least one log (not shown) placed thereon or therebetween over the upper portion 227. In one arrangement, first and second stripping brackets or assemblies $242_1$, $242_2$ may be rigidly attached to and extend away from the support beam 230 (e.g., on the upper portion 227 of the log splitter frame 200 adjacent the first and second side portions 220, 222) for use in dislodging logs from the driven member 262 upon retraction of the piston 262.

As shown, the drive assembly 400 may include a linear actuator in the form of a cylinder 450 (e.g., hydraulic cylinder, etc.) secured to the support beam 230 that is configured to move the piston 264 and driven member 262 in a first direction towards the stop member 238 to split a log received over the upper portion 227 and in an opposite second direction to retract the driven member 262 away from the split log and the stop member 238 along the translation axis. In one arrangement, the support beam 230 may include an anchoring member such as an attachment lug 246 to which an end of the cylinder 250 may be removably secured in any appropriate manner (e.g., via pin 58). The drive assembly 400 may also include a pump and motor assembly 454 that is configured to pump hydraulic fluid from a reservoir through hydraulic lines 466 into one of first and second chambers (not shown) of the hydraulic cylinder 450 (and simultaneously out of the other of the first and second chambers) to correspondingly drive or advance the splitting assembly 265 in either the first or opposite second direction. While one particular arrangement of a drive assembly 400 has been illustrated, it is to be understood that the log splitting apparatus 100 may include various other forms and arrangements of drive assemblies such as those that incorporate a hydraulic system (e.g., including hydraulic pump, fluid lines, cylinder, etc.) or kinetic technology (e.g., including a flywheel, etc.) to drive the piston 264 and driven member 262, those that incorporate gasoline or electric motors, etc.

The trailer 300 may broadly be configured to support the log splitter frame 200 a distance above a fixed surface (e.g., above the ground) and facilitate transport of the log splitter frame 200 between locations. In one arrangement, the trailer 300 may include a number of wheels such as first and second wheels $322_1$, $322_2$ that are interconnected by an axle assembly 326 for rotation about a rotation axis 330 to move the log splitting apparatus 100. For instance, the axle assembly 326 may include an axle (not shown) that interconnects the first and second wheels $322_1$, $322_2$ to allow for rotation thereof as well as any appropriate housing 327 including an internal cavity (not shown) through which the axle extends and which may provide structural support for the log splitter frame 200, the drive assembly 400 (e.g., the pump and motor assembly 454), and/or the like.

The log splitter frame 200 may be rigidly or movably (e.g., pivotally) interconnected to the trailer 300 in any appropriate manner. As just one example and as shown in FIGS. 1a-1b, the log splitter frame 200 may be pivotally connected to the axle assembly 326 for pivotal movement about a pivot axis 334 (e.g., where pivot axis 334 is parallel to rotation axis 330) between at least first and second positions relative to the trailer 300, such as the first and second positions shown in FIGS. 1a and 1b. For instance, a pivot pin 338 (e.g., clevis pin) may be inserted through aligned holes in a first bracket member or assembly 266 rigidly attached to and extending away from the support beam 230 (e.g., on the lower portion 228 of the log splitter frame 200) and in a second bracket member or assembly 336 rigidly attached to and extending away from the housing 327 of the axle assembly 326.

In one arrangement, the trailer 300 may also include a support beam 342 attached to the axle assembly 326 that is broadly configured to provide additional structural support to the log splitter frame 200, the drive assembly 400, and/or the like as well as facilitate interconnection of the log splitting apparatus 100 to a vehicle for transport of the log splitting apparatus 100. The support beam 342 may be of any appropriate cross section and include opposite first and second ends 344, 346 as well as a longitudinal axis 390 extending along a length of the support beam 342 between the opposite first and second ends 344, 346 and running generally perpendicularly to the rotation axis 330. While shown as a single member, the support beam 342 may in some embodiments be made up of two or members (e.g., in one arrangement, telescoping members).

In one arrangement, the first end 344 of the support beam 342 may be attached to the housing 327 of the axle assembly 326. As just one example, bolts or fasteners (not labeled) may be passed through aligned apertures in the second bracket assembly 336 and the support beam 342. For instance, two or more fasteners may be used to inhibit rotation of the support beam 342 relative to the housing 327 during use of the log splitting apparatus 100 to split logs. While the same bracket assembly (the second bracket assembly 336) is illustrated as both pivotally attaching the log splitter frame 200 to the housing 327 and rigidly attaching the support beam 342 to the housing 327, it is also possible for separate bracket assemblies to be used to make such connections.

Any appropriate hitch 348 may be disposed adjacent the second end 346 of the support beam 342 for attachment to a corresponding hitch assembly of a vehicle for transport of the log splitting apparatus 100. At least one support leg 350 may be attachable (e.g., removably attachable) to the support beam 342 in any appropriate manner to support the support beam 342 a distance above the ground when the log splitting apparatus 100 is not attached to a vehicle. More specifically, the support leg 350 may be configured to maintain the longitudinal axis 390 of the support beam 342 substantially parallel to the ground when the log splitting apparatus 100 is in use. In one arrangement, the support leg 350 may be adjustable in height (e.g. telescoping).

The log splitting apparatus 100 may be utilized to split logs with the longitudinal axis 290 of the log splitter frame 200 either substantially parallel to the longitudinal axis 390 of the support beam 342 of the trailer 300 (as in FIG. 1a) or substantially perpendicular to the longitudinal axis 390 of the support beam 342 of the trailer 300 (as in FIG. 1b). In one arrangement, a locking bracket assembly 270 or the like may be attached to and extend away from the support beam 230 (e.g., on the lower portion 228 of the log splitter frame 200) for engagement with the support beam 342 to maintain parallelity of the longitudinal axes 290, 390. For instance, a locking pin 272 may be removably insertable through aligned apertures (not shown or labeled) in the locking bracket assembly 270 and the support beam 342 to lock the log splitter frame 200 to the support beam 342 with the longitudinal axes 290, 390 being parallel. To position the log splitter frame 200 into the position shown in FIG. 1b whereby the longitudinal axis 290 is perpendicular to the longitudinal axis 390, the locking pin 272 may be pulled out of the aperture(s) in the support beam 342 and then the log splitter frame 200 may be pivoted about the pivot axis 334 into the position shown in FIG. 1b. Thereafter, the log splitter frame 200 may be pivoted about the pivot axis 334 back into the position shown in FIG. 1a and the locking bracket assembly 270 and locking pin 272 may be used to secure the log splitter frame 200 in the position shown in FIG. 1a. Other arrangements and manners of locking the log splitter frame 200 in the positon shown in FIG. 1a are also envisioned and included herein.

As discussed previously, power equipment is often shipped to retailers and consumers in a substantially unassembled state and is then required to be assembled by the retailer or consumer. In the case log splitting apparatuses, for instance, the various parts of the log splitting apparatus are typically packaged into a shipping containers (e.g., wooden box, crate, etc.) by a manufacturer or producer and then loaded onto a cargo trailer (e.g., semi-trailer) or the like for eventual shipment to the retailer. With reference to the log splitting apparatus 100 of FIGS. 1a-1b, for example, the support beam 230, cylinder 450, axle assembly 326, first and second wheels $322_1$, $322_2$, pump and motor assembly 454, support beam 342, etc. may all be in an unassembled state and packaged separately into a crate or box for shipment to the retailer or customer.

One concern with shipping power equipment and machinery such as log splitting apparatuses in a substantially unassembled state is difficulties in assembling the power equipment once received and moving the assembled power equipment onto the retail floor or other location for display for consumers. However, it has heretofore been impractical to ship log splitting apparatuses in a substantially fully assembled state due to inefficiencies and/or possible safety concerns with loading fully assembled log splitting apparatuses into a transport enclosure such as a cargo trailer or the like. As one example, loading the assembled log splitting apparatus 100 in the configuration shown in FIG. 1a into a cargo trailer (e.g., where the longitudinal axes 290, 390 are parallel to each other and in a horizontal position within the cargo trailer or otherwise parallel to a floor of the cargo trailer) would utilize more space within the cargo trailer than if the log splitting apparatus 100 was disassembled and loaded into a box or crate as is traditionally done.

In an attempt to make up for such lost space, the assembled log splitting devices 100 could be packaged into boxes or crates and then stacked on top of each other in the cargo trailer to utilize some of the vertical space in the cargo trailer. However, stacking the boxes or crates within the cargo trailer can be difficult due to the weight and/or size of the boxes and can present a risk of the boxes falling during shipment and thus concerns with safety as well as damage to the apparatuses. The result of fewer log splitting apparatuses being loaded into the transport enclosure and less efficient use of space in the transport enclosure during a particular shipment is increased expenses for the distributor and thus the retailer or customer.

In view of the foregoing, disclosed herein are various utilities (e.g., apparatuses, systems, methods, etc.) for use in loading power equipment such as log splitting apparatuses onto cargo trailers or the like in manners that increase the number of assembled log splitting apparatuses that can be loaded onto the cargo trailers (or otherwise result in more efficient loading of assembled log splitting apparatuses onto the cargo trailers) while facilitating assembled presentation of the log splitting apparatuses after unloading from the cargo trailer. As will be discussed in more detail herein, the disclosed utilities facilitate loading and shipment of substantially assmbled log splitting apparatuses with the longitudinal axes of the log splitter frames of the apparatuses (e.g., longitudinal axis 290 of log splitter frame 200) being substantially vertical in a resting position within the transport enclosure (e.g., with the longitudinal axes of the log splitter frames of the apparatuses being generally perpendicular to the floor of the enclosure). Shipping substantially fully assembled log splitting apparatuses in this manner advantageously utilizes a smaller footprint within the transport enclosure (e.g., as compared to shipping log splitting apparatuses with the log splitter beams in a horizontal position within the transport enclosure, such as in the position of FIG. 1) by instead making use of vertical space within the enclosure that may otherwise be wasted (e.g., such as due to safety concerns with stacking log splitting apparatuses in the transport enclosure).

In the event that a trailer of the log splitting apparatus includes a support beam (e.g., support beam 342), a longitudinal axis of the support beam (e.g., longitudinal axis 390) may also be positioned vertically within the transport enclosure to further reduce the footprint occupied by the assembled log splitting device. As just one example, the log splitter beam 200 of the apparatus 100 may be positioned into the configuration shown in FIG. 1a whereby the longitudinal axes 290, 390 of the log splitter beam 200 and support beam 342 of the trailer 300 are substantially parallel. Thereafter, the entire apparatus 100 may be pivoted about the rotation axis 330 of the trailer 300 so that both of the longitudinal axes 290, 390 are in a vertical position; this step may be performed before or after loading the apparatus into a transport enclosure.

As another example, the log splitter beam 200 of the apparatus 100 may be positioned into the configuration shown in FIG. 1b whereby the longitudinal axis 290 is in a vertical position and is perpendicular to the longitudinal axis 390 of the support beam 342. Thereafter, the support beam 342 may be pivoted into a vertical position so that the longitudinal axis 390 is vertical and parallel to the longitudinal axis 290. In this example, it may be necessary to remove all but one of the bolts or fasteners securing the support beam 342 to the axle assembly 326 (e.g., via the second bracket assembly 336) to allow for rotation of the support beam 342 about an axis that is parallel to the pivot axis 334. Once in the vertical positon, the locking bracket assembly 270 may be used to secure the support beam 342 to the log splitter frame 200. Also in this example, the axle assembly 326 and pump and motor assembly 454 may not rotate about the rotation axis 334 or may otherwise remain in the same position. For instance, compare FIGS. 1b and 3b. In any case, the substantially assembled apparatus 100 may be positioned into any appropriate resting position within the transport enclosure (e.g., cargo trailer) with the longitudinal axes 290, 390 in a vertical position. Additional log splitting apparatuses may be similarly positioned within the transport enclosure.

Figure 2:
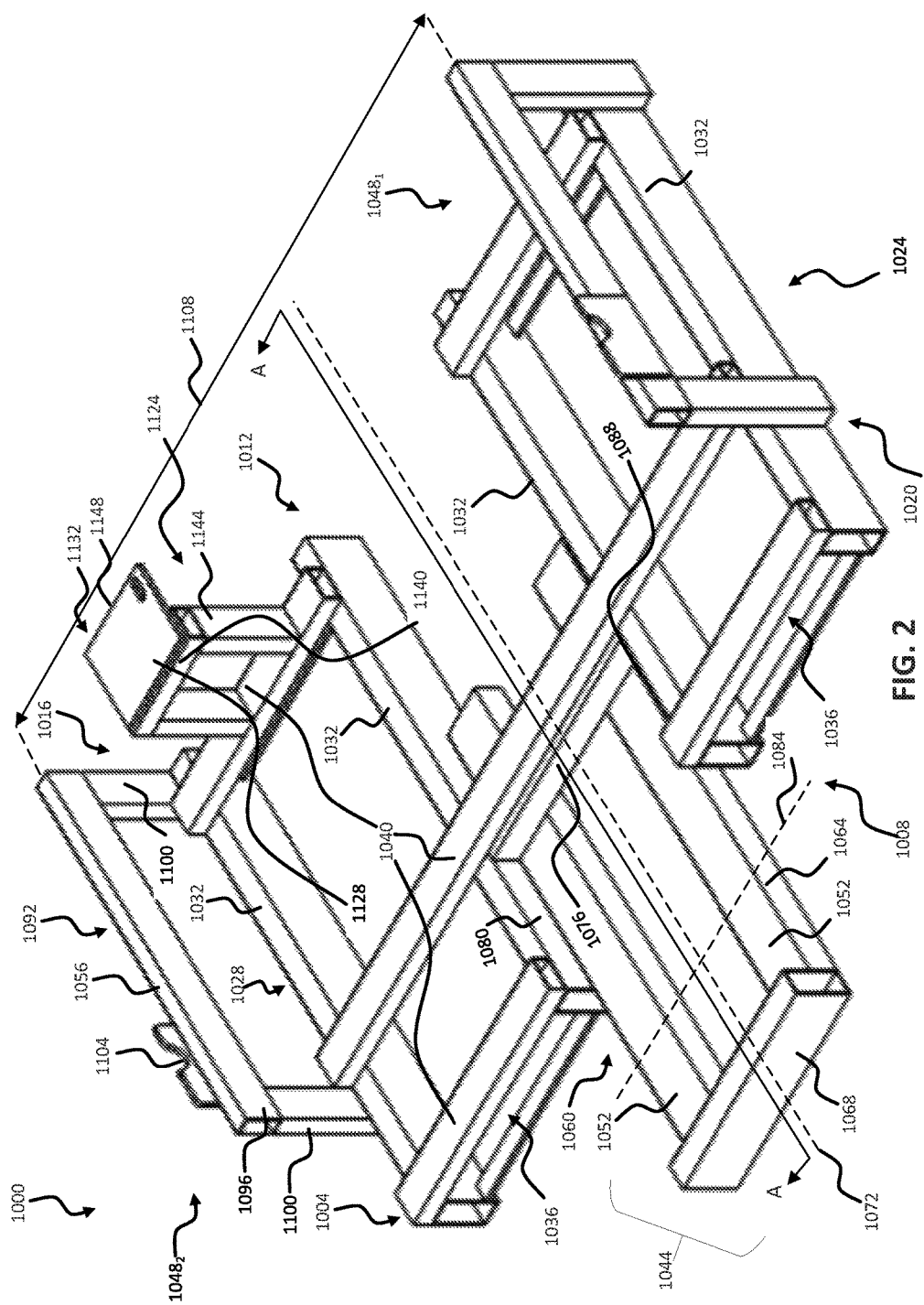
FIG. 2 is a perspective view of a support base for supporting and shipping power equipment in a substantially assembled configuration, according to one embodiment.
Figure 3A:
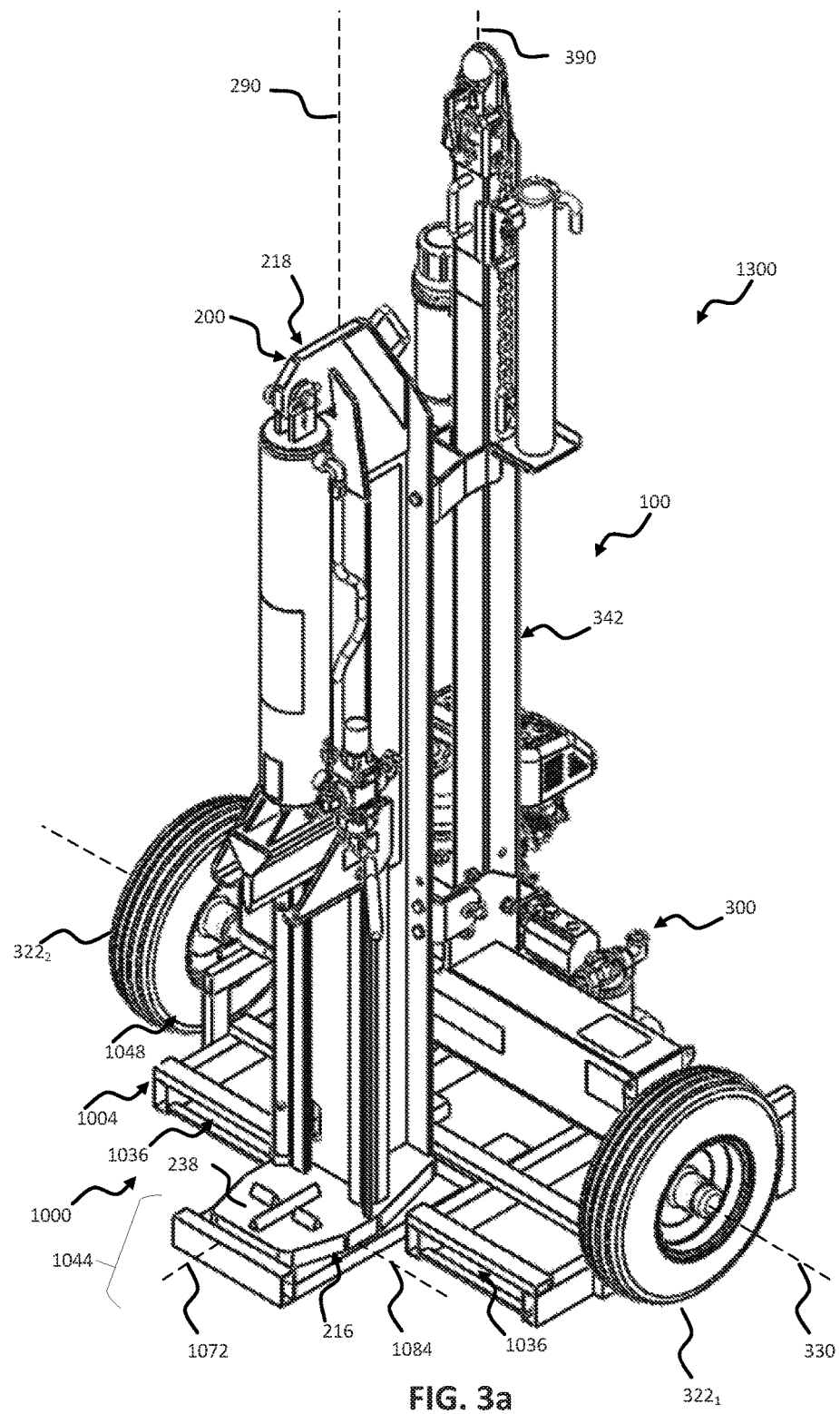
FIG. 3a is perspective view of the support base of FIG. 2 with the log splitting apparatus of FIGS. 1a-1b being supported thereon in a vertical orientation.
Figure 3B:
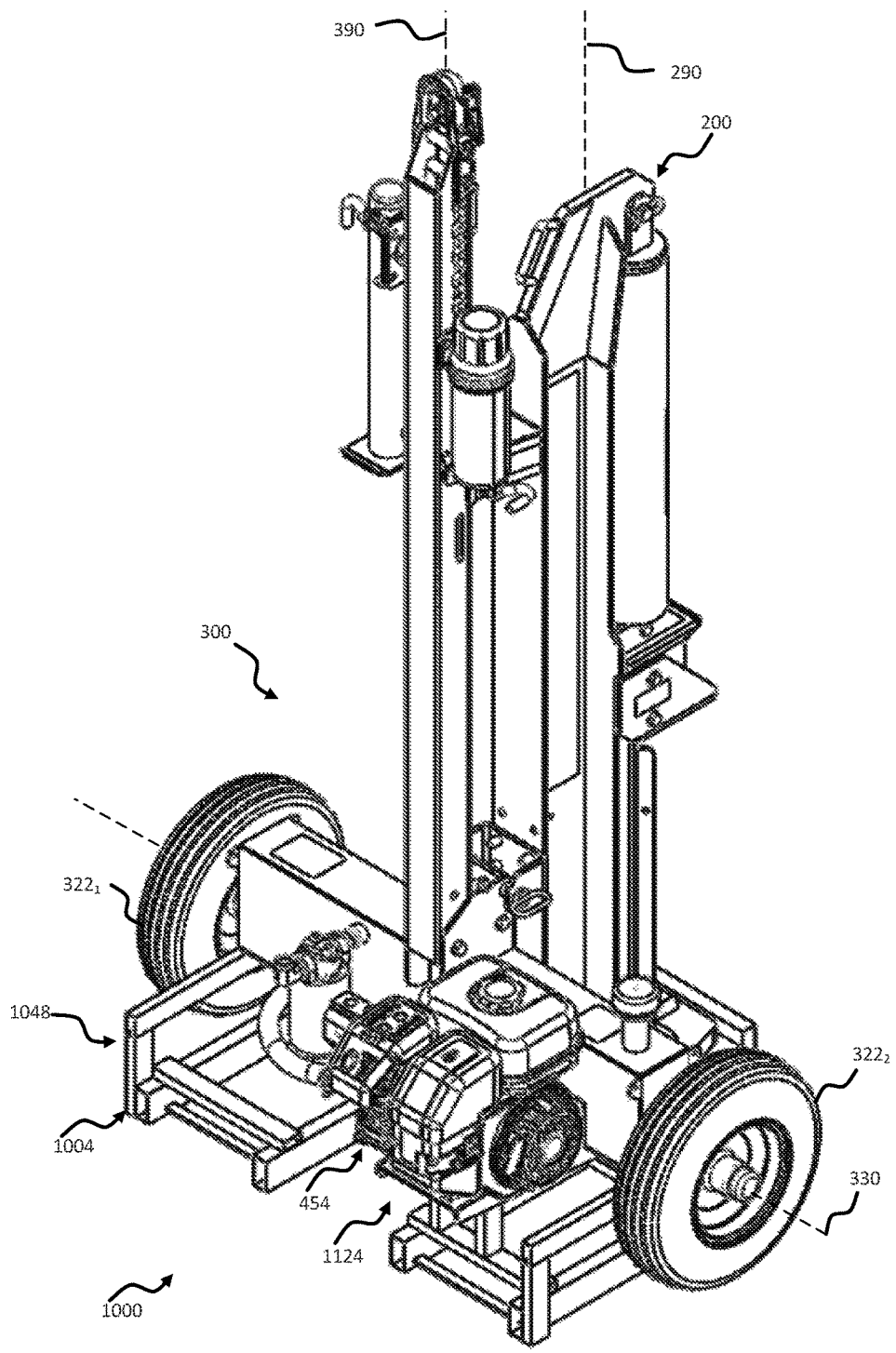
FIG. 3b is a perspective view similar to that in FIG. 3a, but from a different perspective.

To facilitate maintenance of a substantially assembled log splitting apparatus (e.g., the log splitting apparatus 100 or another log splitting apparatus) in such a vertical orientation (e.g., where the longitudinal axes 290, 390 are both positioned vertically) within a transport enclosure, FIGS. 2 and 3a present perspective views of a support base 1000 (e.g., pallet, transport structure, etc.) onto or over which an assembled log splitting apparatus (e.g., log splitting apparatus 100) may be positioned that is configured to maintain the longitudinal axes 290, 390 in a vertical orientation. Broadly, the support base 1000 includes a framework 1004 that generally includes opposite front and rear portions 1008, 1012, opposite top and bottom portions 1016, 1020, and opposite first and second side portions 1024, 1028.

For instance, the framework 1004 may include a plurality of stringers 1032 (e.g., runners) having lengths that generally run from the front portion 1008 to the rear portion 1012 and that provide a primary source of structural support for the support base 1000. The stringers 1032 may include opposite top and bottom surfaces (not labeled), where the bottom surfaces of the stringers 1032 may be configured to contact a support surface (e.g., ground, floor, etc.). As shown, the stringers 1032 may be spaced by any appropriate distance to create a number of channels 1036 (e.g., passageways) through the framework 1004 for insertion or passage of tools of any appropriate machine (e.g., such as forks or tines of a forklift or the like) configured to manipulate (e.g., lift) the support base 1000 and a log splitting apparatus (e.g., log splitting apparatus 100) positioned thereover. The framework 1004 may also include any appropriate number or arrangement of cross-members 1040 rigidly interconnected in any appropriate manner to adjacent stringers 1032 to form a rigid, structurally sound unit.

The support base 1000 may also include at least first and second location apparatuses 1044, 1048 that include respective receiving surfaces 1052, 1056 for receiving respective first and second portions of a log splitting apparatus (e.g., log splitting apparatus 100) when the longitudinal axis of the log splitter frame (e.g., longitudinal axis 290) and, if included, the longitudinal axis of the support beam of the trailer (e.g., longitudinal axis 390), are both in a vertical orientation. More specifically, the first and second location apparatuses 1044, 1048 are configured to make contact with respective first and second portions of the log splitting apparatus 100 to counteract any moments about the rotation axis 330 created by virtue of asymmetrical weight distribution of the apparatus 100 to maintain the verticality of the longitudinal axes 290, 390 (and that would otherwise tend to rotate the entire apparatus 100 about the rotation axis 330 so that the longitudinal axes 290, 390 are other than substantially vertical, such as substantially horizontal). The first and second location apparatuses 1044, 1048 may also be configured to inhibit horizontal movement or translation of the apparatus 100 (e.g., such as in directions perpendicular to the vertically-positioned longitudinal axes 290, 390) absent the log splitting apparatus 100 first being lifted or otherwise moved in a direction along the longitudinal axes 290, 390.

In one arrangement, the first location apparatus 1044 may be in the form of a platform 1060 that is rigidly attached or connected to and that protrudes from the front portion 1008 of the framework 1004 in any appropriate manner, where an upper surface of the platform 1060 is the receiving surface 1052 that receives the first portion of the log splitting apparatus 100. As just one example, the platform 1060 may include one or more beams 1064 that extend outwardly from the front portion 1008 of the framework 1004 for receipt of a first portion of the log splitting apparatus 100. With reference to FIG. 3a, for example, the receiving surface 1052 of the first location apparatus 1044 may be sized for receipt of a portion of the log splitter frame 200 near the first end 216, such as the stop member 238.

In one embodiment, the first location apparatus 1044 may also include one or more projections, protrusions, or the like attached to and extending away from the receiving surface 1052 for use in inhibiting movement of the first portion of the log splitting apparatus (e.g., of the stop member 238) in directions generally perpendicular to the longitudinal axis 290 of the log splitter beam 200. For instance, the first location apparatus 1044 may include at least a first wall 1068 extending upwardly away from the receiving surface 1052 for inhibiting movement of the stop member 238 in a first direction along a first axis 1072 that is perpendicular to the longitudinal axis 290 and/or an opposite second wall 1076 extending upwardly away from the receiving surface 1052 for inhibiting movement of the stop member 238 in an opposite second direction along the first axis 1072.

As another example, the first location apparatus 1044 may also include at least a third wall 1080 extending upwardly away from the receiving surface 1052 for inhibiting movement of the stop member 238 in a first direction along a second axis 1084 that is perpendicular to the longitudinal axis 290 and/or an opposite fourth wall 1088 extending upwardly away from the receiving surface 1052 for inhibiting movement of the stop member 238 in an opposite second direction along the second axis 1084. For instance, the third and fourth walls 1080, 1088 may be part of two of the stringers 1032 of the framework 1004. In one arrangement, the first and second axes 1072, 1084 may be substantially perpendicular to each other to substantially inhibit movement of the stop member 238 within a plane perpendicular to the longitudinal axis 290 (absent the stop member 238 being lifted in a direction parallel to or along the longitudinal axis 238). In one embodiment, the receiving surface 1052 and various walls may essentially form a tray or depression for receipt of the stop member 238 (or other portion of the log splitter frame 200).

The second location apparatus 1048 may also be in the form of at least one platform 1092 that is rigidly attached or connected to and that protrudes from the top portion 1008 of the framework 1004 in any appropriate manner, where an upper surface of the platform 1092 is the receiving surface 1056 that receives the second portion of the log splitting apparatus 100. As just one example, the platform 1092 may be formed by at least one stringer 1096 (e.g., beam, runner, etc.) as well as one or more upstanding members 1100 rigidly attached to the framework 1004 to position the stringer 1096 above the top portion 1008. The receiving surface 1056 may be configured to receive a portion of the trailer of a log splitting apparatus (e.g., a portion of trailer 300 of log splitting apparatus 100), such as the axle assembly 326. See FIGS. 2, 3a, and 3b. In one embodiment, a portion of receiving surface 1056 of the second location apparatus 1048 may include a concavity 1104 for receiving the axle of the axle assembly 326 for inhibiting or constraining movement of the axle assembly 326 in first and second opposite directions parallel to first axis 1072 (e.g., in the absence of the axle assembly 326 being at least partially lifted away from the receiving surface 1056).

In one arrangement, the support base 1000 may include first and second second location apparatuses 1048₁, 1048₂ that are respectively disposed adjacent the first and second side portions 1024, 1028 of the framework 1004 such that the receiving surfaces 1056 of each of the first and second second location apparatuses 1048₁, 1048₂ are configured to receive a different respective portion of the axle assembly 326. A distance 1108 between respective outer side portions of the first and second second location apparatuses 1048₁, 1048₂ may be selected to be less than a distance between respective inner surfaces of the first and second wheels 322₁, 322₂ of the trailer 300. In this regard, upon placement of the axle assembly 326 of the trailer 300 over the receiving surfaces 1056 of the first and second second location apparatuses 1048₁, 1048₂, a portion of each of the first and second wheels 322₁, 322₂ may hang or at least extend below the receiving surfaces 1056 adjacent the outer sides of the first and second second location apparatuses 1048₁, 1048₂. See FIG. 3a. This arrangement advantageously limits or constrains movement of the trailer 300 (and thus the apparatus 100 as a whole) in first and second opposite directions along the rotation axis 330. The specific distance 1108 may be selected to provide a desired amount of slop relative to the particular log splitting apparatus being positioned over the support base 1000.

Figure 7:
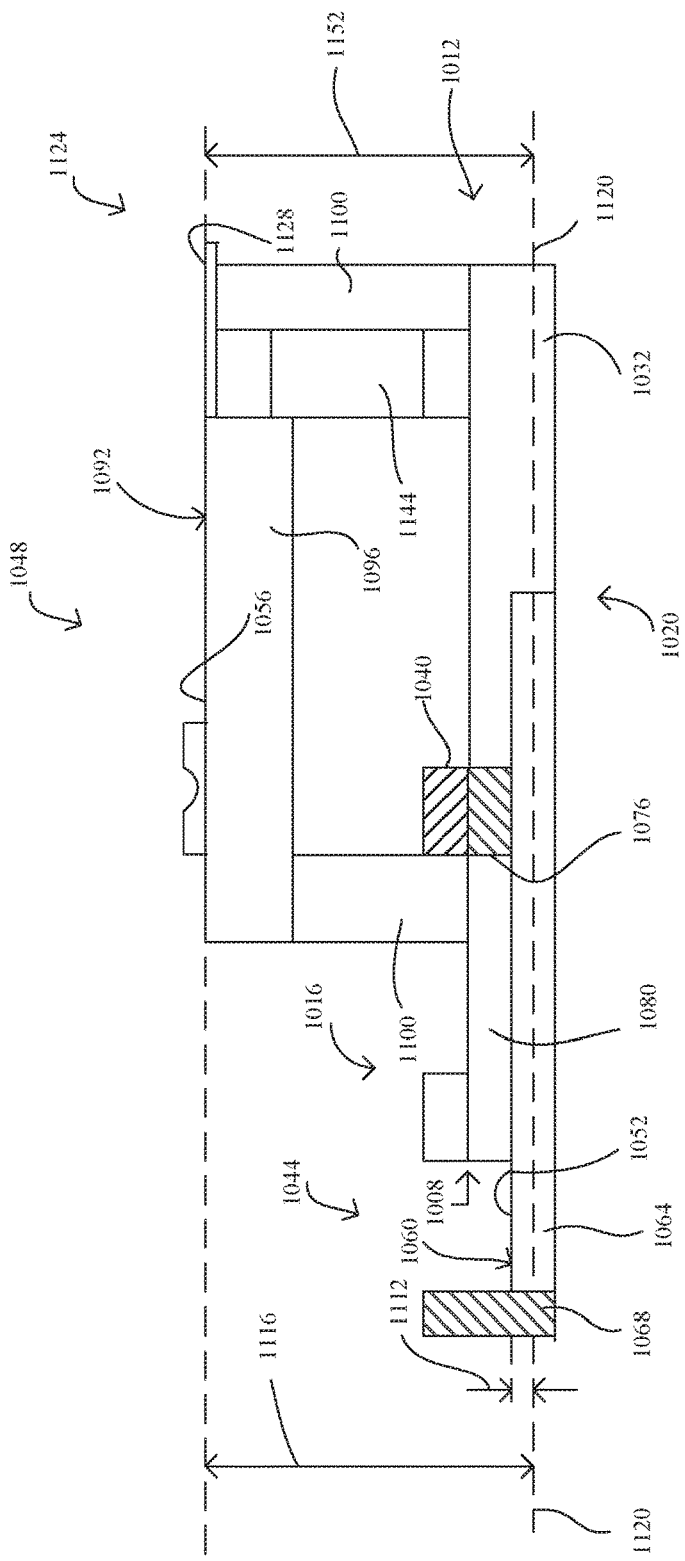
FIG. 7 is a sectional view along the section A-A of FIG. 2.

With reference to FIG. 7, it can be seen how the receiving surfaces 1052, 1056 of the first and second location apparatuses may be spaced different distances 1112, 1116 from a reference plane 1120 passing through the framework 1004 that is generally parallel to the top and bottom portions 1016, 1020 of the framework 1004 (and perpendicular to the longitudinal axes 290, 390 of the apparatus 100 placed over the support base 1000). This arrangement accounts for the situation where, like with the disclosed apparatus 100, the axle assembly 326 of the trailer 300 would be spaced from a support surface (e.g., floor of cargo trailer) when the apparatus 100 is positioned so that the longitudinal axes 290, 390 are both positioned vertically. More specifically, this arrangement advantageously assists in stabilizing the apparatus to prevent or limit tilting of the apparatus 100 away from the position where the longitudinal axes 290, 390 are both positioned vertically (e.g., due to asymmetrical weight distribution of the apparatus 100 when the longitudinal axes 290, 390 are both positioned vertically).

In one arrangement, the support base 1000 may include a third location apparatus 1124 having a receiving surface 1128 for receiving a respective third portion of a log splitting apparatus (e.g., log splitting apparatus 100) when the longitudinal axis of the log splitter frame (e.g., longitudinal axis 290) and, if included, the longitudinal axis of the support beam of the trailer (e.g., longitudinal axis 390), are both in a vertical orientation. Receipt of the third portion of the log splitting apparatus 100 on the receiving surface 1128 of the third location apparatus 1124 further serves to stabilize the apparatus 100 in the aforementioned vertical orientation. As an example, the third location apparatus 1124 may be in the form of at least one platform 1132 that is rigidly attached or connected to and that protrudes from the top portion 1008 of the framework 1004 adjacent the rear portion 1012 of the framework 1004.

For instance, the platform 1132 may be formed by at least one cross-member 1140 (e.g., beam, runner, stringer, etc.) as well as one or more upstanding members 1144 rigidly attached to the framework 1004 to position the cross-member 1140 above the upper portion 1016. To increase the surface area of the receiving surface 1128, a rigid plate 1148 or the like may be appropriately secured to the cross-member. The receiving surface 1128 may be configured to receive a portion of the drive assembly of a log splitting apparatus (e.g., a portion of drive assembly 400 of log splitting apparatus 100), such as the pump and motor assembly 454. See FIG. 3b. With reference to FIG. 7, it can be seen how a distance 1152 between the reference plane 1120 and the receiving surface 1128 of the third location apparatus 1124 may be greater than the distance 1112 and the same as the distance 1116 (as shown in FIG. 7) or different than the distance 1116 (greater or less than) depending upon the particular design and configuration of the log splitting apparatus.

Figure 4B:
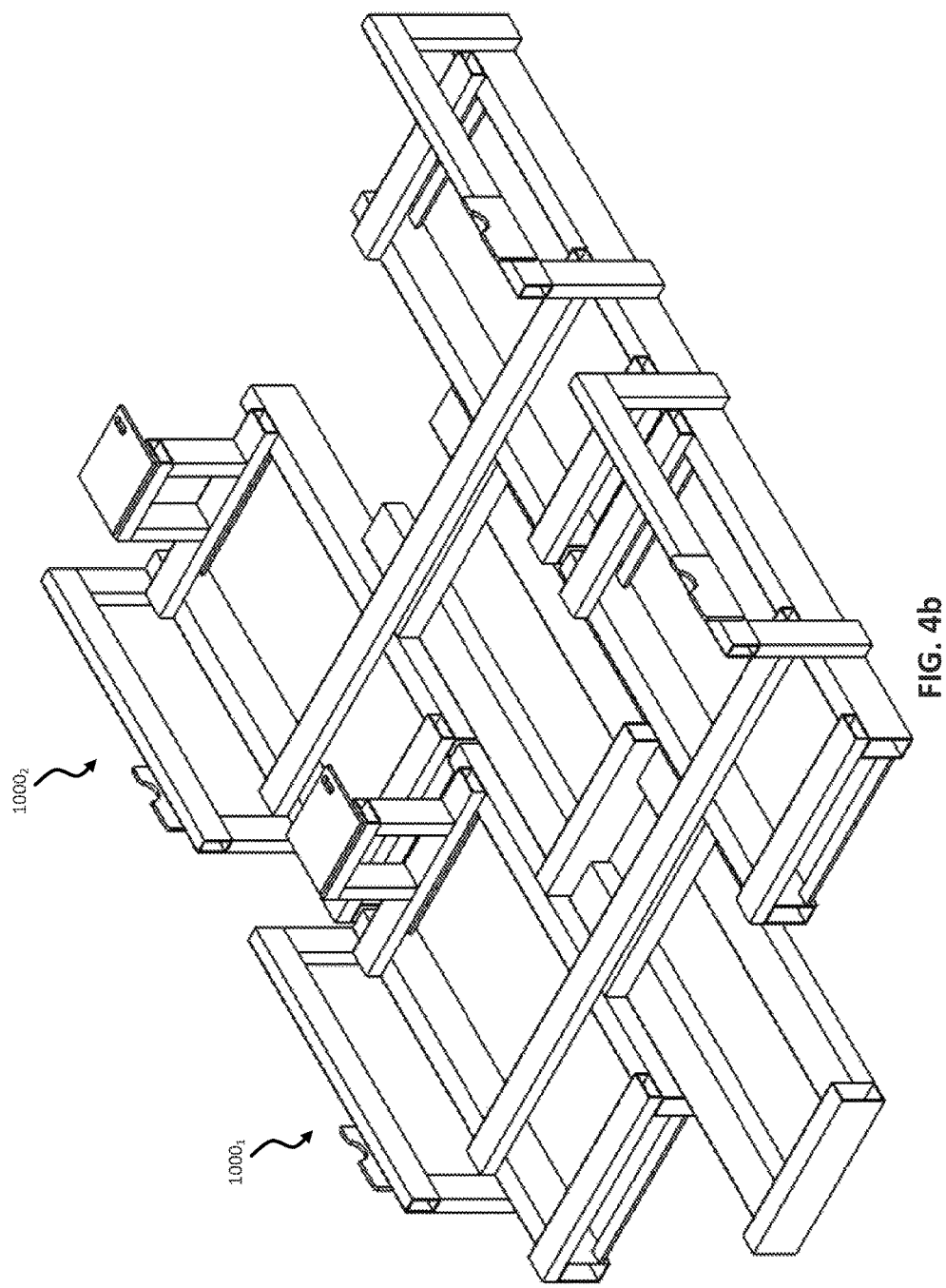
FIG. 4b is a perspective view similar to that in FIG. 4a, but with the first and second support bases being in a nested configuration.
Figure 5A:
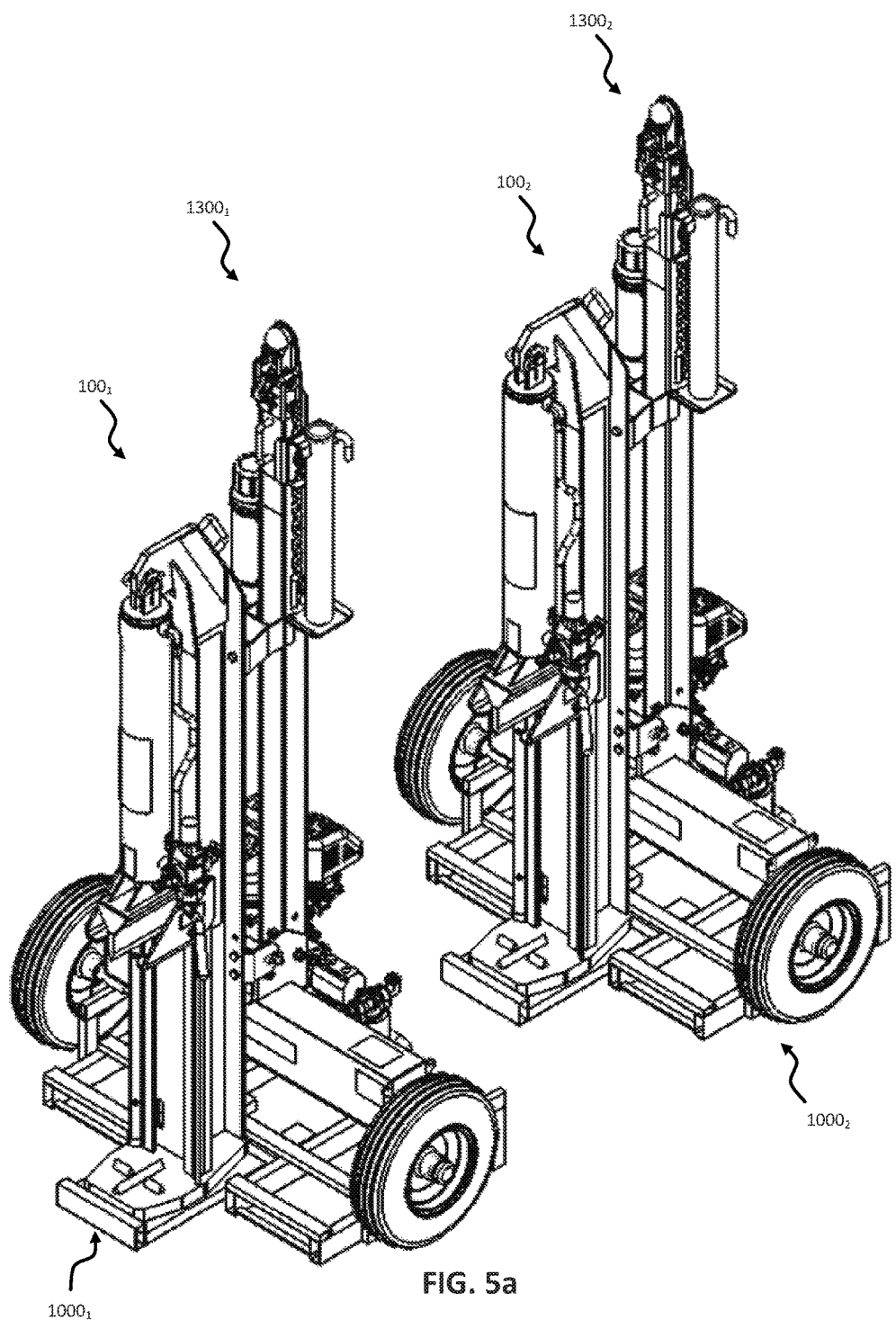
FIG. 5a is a perspective view of the first and second of the support bases of FIG. 4a with first and second of the log splitting apparatuses of FIGS. 1a-1b being respectively supported thereon.
Figure 5B:
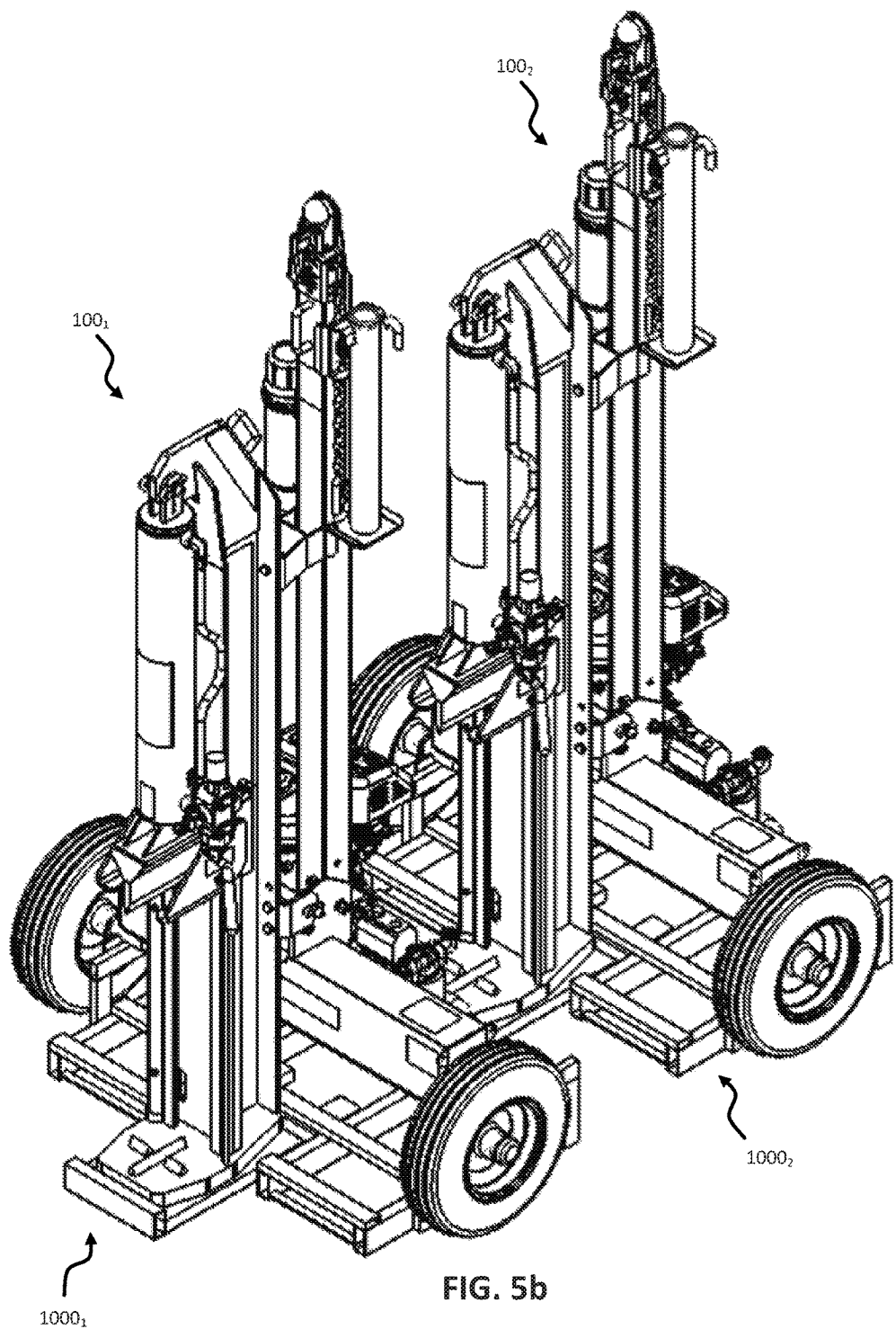
FIG. 5b is a perspective view similar to that in FIG. 5b, but with the first support base and log splitting apparatus being partially nested with the second support base and second log splitting apparatus.
Figure 5C:
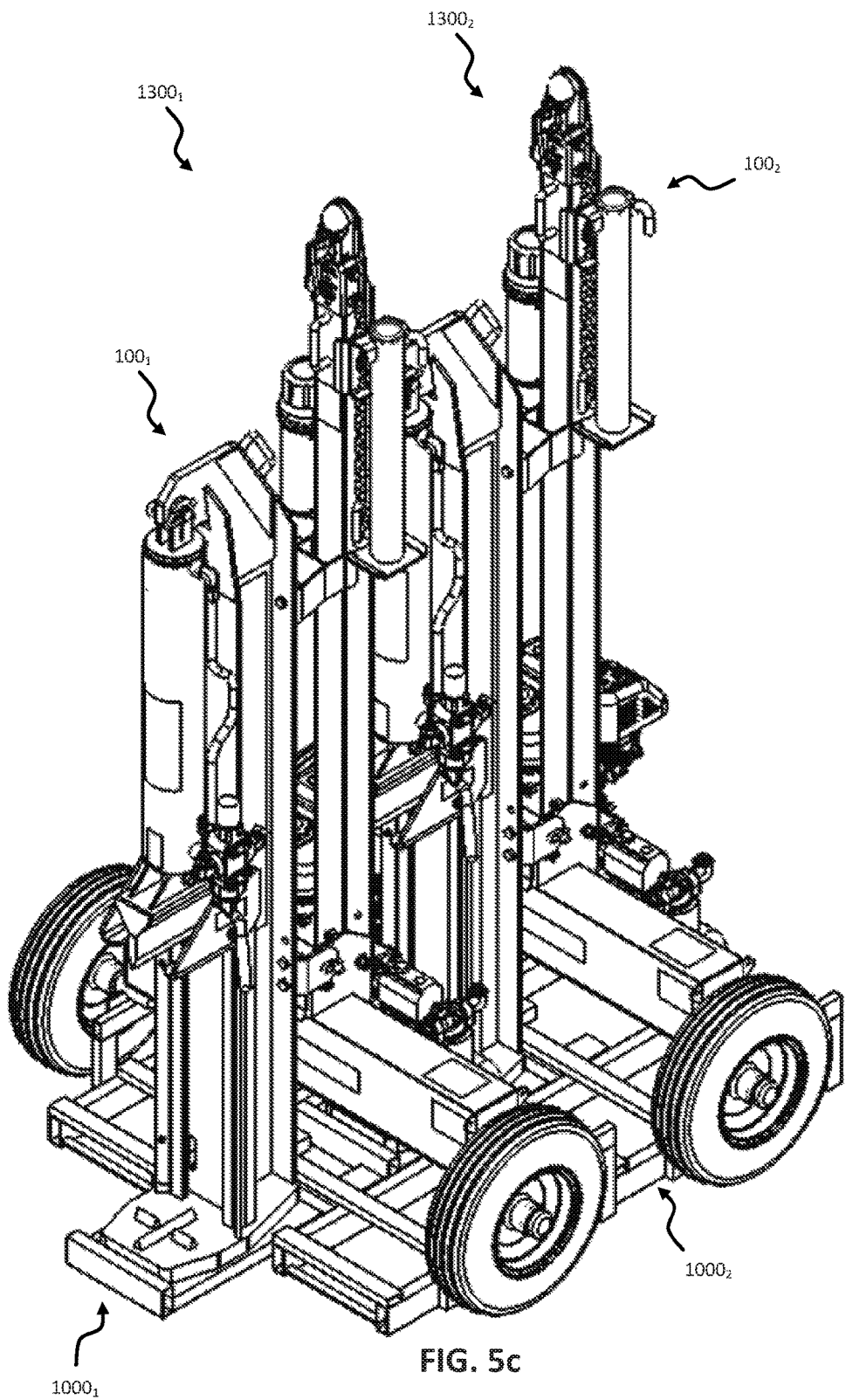
FIG. 5c is a perspective view similar to that in FIG. 5b, but with the first support base and log splitting apparatus being fully nested with the second support base and second log splitting apparatus.

With reference to FIGS. 4a-4b, it can be seen how adjacent first and second support bases 1000₁, 1000₂ can advantageously be nested, such as by inserting a portion of the first location apparatus 1044 of the second support base 1000₂ into a gap or opening 1156 in the defined between adjacent stringers 1032 of the framework 1004 of the first support base 1000₁. The first and second support bases 1000₁, 1000₂ can similarly be nested with adjacent support bases, and so on. With reference to FIGS. 5a-5c, this arrangement advantageously allows for the nesting of adjacent log splitting apparatus systems $1300_1$, $1300_2$ during shipment and the like to make more efficient use of shipping space, where the first system $1300_1$ includes a first log splitting apparatus 1001 supported over the first support base $1000_1$ and the second system $1300_2$ includes a second log splitting apparatus 1002 supported over the second support base $1000_2$. As nested, a portion of one log splitting apparatus is disposed above or below a portion of an adjacent log splitting apparatus.

In use, a particular log splitting apparatus such as the log splitting apparatus 100 may be appropriately moved (e.g., rolled) over to a respective support base 1000 so as to position first and second wheels $322_1$, $322_2$ adjacent the outside surfaces of the first and second second location apparatuses $1048_1$, $1048_2$ and rest or otherwise support the axle assembly 326 on the receiving surfaces 1056 of the first and second second location apparatuses $1048_1$, $1048_2$. Part of this process may also include positioning the pump and motor assembly 454 onto the receiving surface 1128 of the third location apparatus 1124 and the stop member 238 onto the receiving surface 1052 of the first location apparatus 1044 (e.g., so that the stop member 238, axle assembly 326, and pump and motor assembly 454 are simultaneously resting or received on the receiving surfaces 1052, 1056, 1128 of the first, second and third location apparatuses 1044, 1048, 1124). For instance, the apparatus 100 in the configuration of FIG. 1b may be rolled over and positioned onto a support base 1000 as discussed above and then the support beam 342 of the trailer 300 may be appropriately pivoted or moved into the vertical position so that its longitudinal axis 390 is vertical and parallel to the longitudinal axis 290 of the log splitter frame 200 (e.g., via appropriately manipulating the bolts through the second mounting bracket assembly 336). Alternatively, the support beam 342 may first be moved into the vertical position and then the apparatus 100 may be rolled over and positioned onto the support base 1000.

Figure 6A:
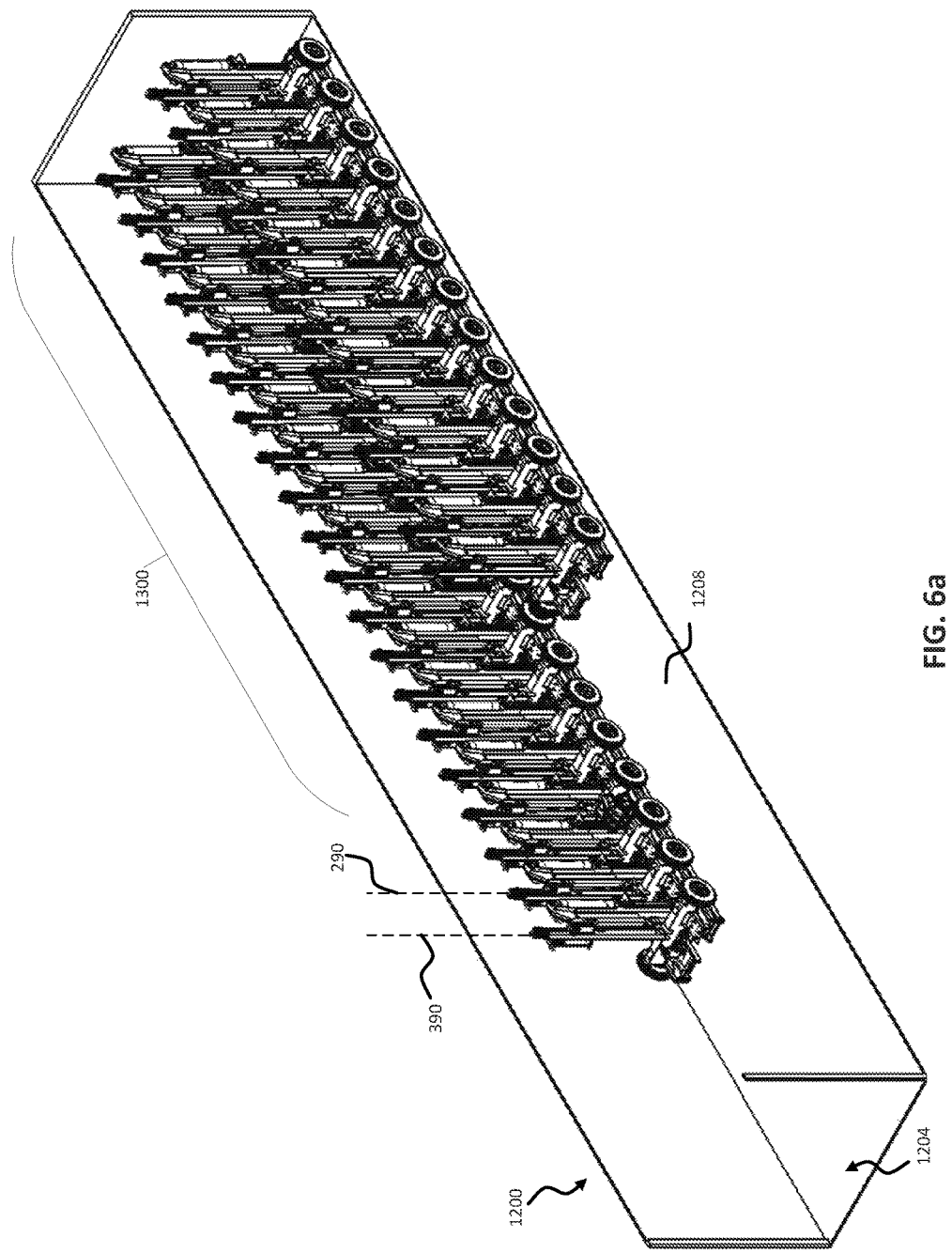
FIG. 6a is a perspective view of a transport enclosure having a first plurality of support bases and respective log splitting apparatuses disposed therein.
Figure 6B:
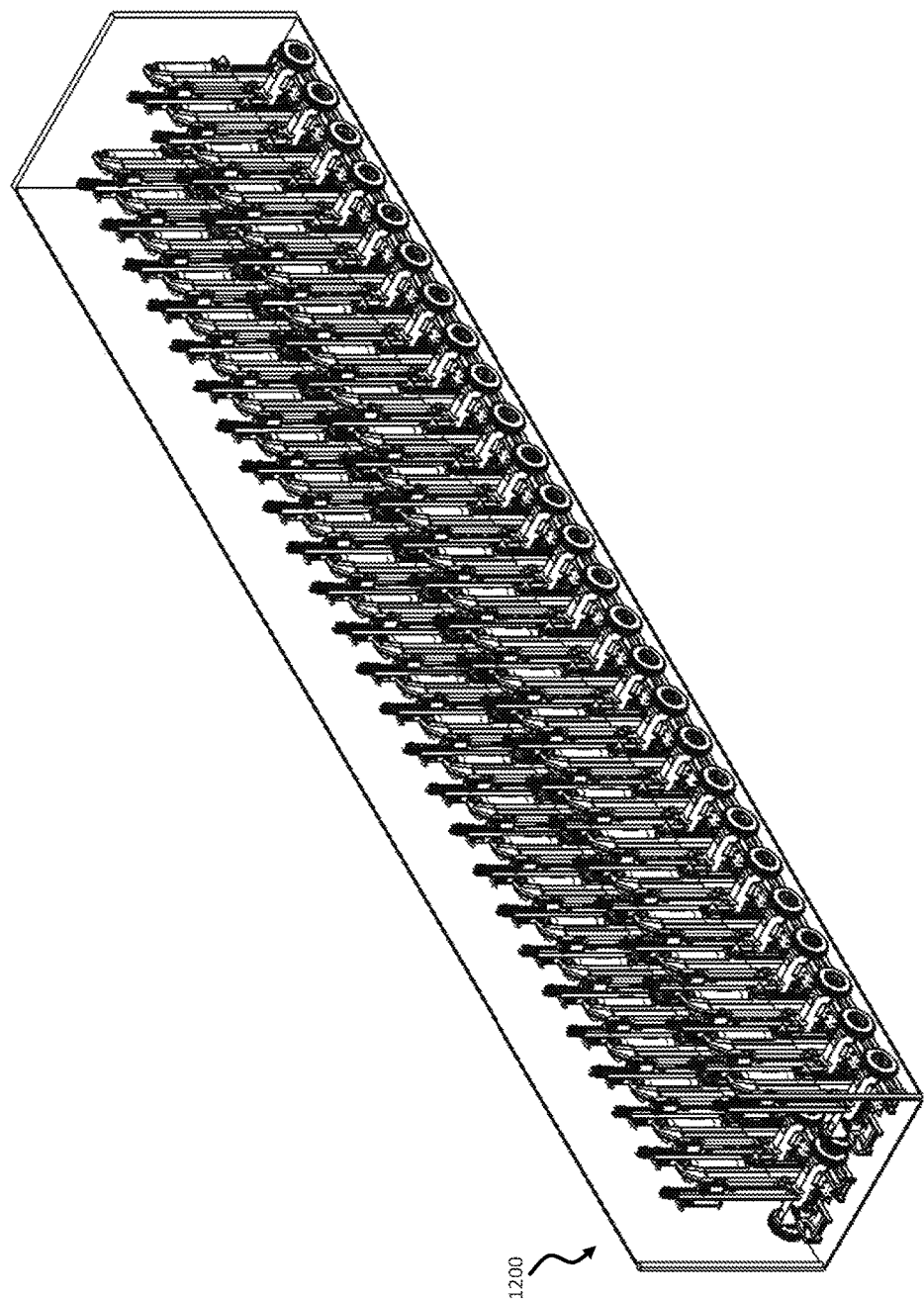

FIGS. 6a-6b illustrate a plurality of log splitting apparatus systems 1300 being loaded into an interior 1204 of a transport enclosure 1200 (e.g., semi-trailer) and, more specifically, illustrate the efficient use of the interior 1204 of the transport enclosure 1200 by way of positioning the longitudinal axes 290, 390 vertically within the interior 1204 which vertical positioning is maintained by the support bases 1000. In one arrangement, a forklift or the like may be used to lift each system 1300 off a floor or ground surface (e.g., via inserting fork tines into channels 1036 in support base 1000) and appropriately position the system 1300 onto the bed or floor 1208 of the transport enclosure 1200. In one arrangement, the forklift may be driven (with the system 1300 on the fork tines thereof) directly into the interior 1204 of the transport enclosure 1200 and the system 1300 may be deposited at an appropriate location within the interior 1204. Alternatively, support bases 1000 may be positioned on the floor 1208 of the transport enclosure 1200 and then log splitting apparatuses 100 may be appropriately moved into the transport enclosure 1200 (e.g., via rolling the same up a ramp or the like) and positioned over respective support bases 100. In any case, adjacent systems 1300 may be nested as discussed previously in relation to FIGS. 5a-5c.

If necessary, a system 1300 may be repositioned by pushing, pulling or otherwise urging the entire system 1300 so as to slide the lower portion 1020 of the support base 1000 over the floor 1208 or other surface. In the event the wheels $322_1$, $322_2$ contact the floor 1208 or other ground surface when the log splitting apparatus 100 is positioned over the support base 1000 as discussed above with the longitudinal axes 290, 390 in the vertical positon (or otherwise perpendicular to the floor 1208 or other surface), the wheels $322_1$, $322_2$ may roll as the system 1300 is being moved. In any case, once the transport enclosure 1200 has arrived at a destination such as a retailer, each system 1300 may be unloaded from the transport enclosure 1200 and appropriately moved into a receiving location within the retailer, whereupon the log splitting apparatus 100 may be removed from the support base 1000 in a substantially fully assembled state and the log splitting apparatus may be presented for sale.

As an example, a "substantially fully assembled state" may be when the log splitting apparatus 100 is in an at least 50% assembled state; in other words, this may be when at least 50% of the parts of the log splitting apparatus 100 are connected to another part of the log splitting apparatus 100 (e.g., or when no more than 50% of the parts of the log splitting apparatus 100 are not connected to another part of the log splitting apparatus 100). As another example, a "substantially fully assembled state" may be when the log splitting apparatus 100 is in an at least 75% assembled state, or in an at least 95% assembled state).

In one arrangement, the retailer may move the support beam 342 of the trailer 300 back into a horizontal position such as by releasing the locking bracket assembly 270, pivoting the support beam 342, and then inserting the various bolts or fasteners through the second bracket assembly (or other appropriate mounting bracket) and the end of the support beam 342 so as to fix the support beam in the horizontal position (as in FIGS. 1a-1b). The retailer may then roll the log splitting apparatus to any appropriate location by lifting the end of the support beam 342 and rolling the same apparatus on the first and second wheels $322_1$, $322_2$.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the disclosure herein.

While the first, second and third location apparatuses 1044, 1052, 1124 have been discussed as being positioned on the framework 1004 at particular positions and having receiving surfaces 1052, 1056, 1128 disposed at particular distances 1112, 1116, 1152 from the reference plane 1120, it is to be understood that numerous variations to such positions and distances may be made based on the particular log splitting apparatus being supported (e.g., the dimensions thereof, the particular components, thereof, etc.) so as to maintain the longitudinal axes 290 and/or 390 of the apparatus in a vertical position (or otherwise perpendicular to the floor or ground surface) by way of counteracting any asymmetrical mass distributions that may otherwise tend to tilt the apparatus and move the longitudinal axes out of the vertical positions.

It is also envisioned that fewer or more than the three location apparatuses may be included as part of a particular support base 1000. In one variation, for instance, only the first and third location apparatuses 1024, 1124 may be included (e.g., in which the case the third location apparatus 1124 would become the "second" location apparatus). Furthermore, the various location apparatuses may take forms different than described and shown herein. For instance, the second location apparatus 1048 may in one embodiment include a single receiving surface 1056 that extends all the way across the upper portion 1016 of the framework 1004 between the first and second side portions 1024, 1028. As another example, the upstanding members 1100 and stringers 1096 of each second location apparatus 1048 may be replaced with a single plate or continuous wall. Still further, one or more additional or different location apparatuses may be included as part of the support base 1000 so that the same support base 1000 can accommodate log splitting apparatuses or power equipment of different configurations or designs. Furthermore, various additional modifications may be made to the support base 1000 disclosed herein. As an example, while the framework 1004 has been illustrated and described as being made up of a particular arrangement of stringers 1032 and cross-members 1040, the framework 1004 may take numerous other forms without departing from the spirit of the present disclosure.

It is noted that the reference plane 1120 (see FIG. 7) has been described merely for purposes of explaining how two or more of the location apparatuses of the support base 1000 may be disposed at different heights relative to the vertical (or otherwise relative to the perpendicular from the ground or a floor) so as to counteract asymmetrical mass distributions that may otherwise tend to tilt a log splitting apparatus away from the vertical. Thus, the reference plane 1120 may be disposed at locations other than that shown in FIG. 7 so long as it is substantially horizontal or otherwise parallel to a ground or floor surface over which the support base 1000 is resting.

In one arrangement, the support base 1000 may be configured to maintain the longitudinal axes 290, 390 in specific positions other than vertical, such as at 45° to the ground or floor surface, 75° to the ground or floor surface, etc. This may be advantageous depending upon the specific configuration of the interior 1204 of the transport enclosure 1200, a specific display arrangement desired by a retailer, and/or the like.

In one arrangement, one or more of the location apparatuses may be adjustable to accommodate specific log splitting apparatuses and/or to position log splitting apparatuses and particular desired orientations. As just one example, each of the upstanding members 1100 of the second location apparatus 1048 may in one arrangement be telescoping to allow a user to adjust the distance 1116 between the receiving surface 1056 and the reference plane 1120.

The support base 1000 may be constructed of any appropriate materials and of any appropriate dimensions consistent with the present disclosure.

As discussed herein, the support base 1000 may be configured to accept and support various other types of log splitting apparatuses other than the log splitting apparatus 100 disclosed herein. In one arrangement, the support beam 342 may be attached to the axle assembly 326 at locations other than at the first end 344 (e.g., at a location between the first and second ends 344, 346), such as when the log splitter frame 200 is not configured to pivot about pivot axis 334 relative to support beam 342 and is rigidly fixed in a position that is parallel to the support beam 342. As another example, and with reference to FIG. 1a, for instance, the support beam 234 of the log splitting frame 200 and the support beam 342 of the trailer 300 may be replaced with a single support beam that serves as a support for the log splitter frame and for the trailer and that could attach to a vehicle. In this case, the longitudinal axes 290, 390 would become a single longitudinal axis.

The various uses of "first," "second," "third," etc. herein (e.g., "first location apparatus," "second location apparatus," etc.) have been used merely to facilitate the reader's understanding of the various teachings herein and are not meant to limit the disclosure. As just one example, the first location apparatus 1024 could in some embodiments be the "second" location apparatus.

The support base 1000 disclosed herein may also be used to maintain other types of power equipment and machinery in desired positions relative to a ground or floor for use in shipping of the power equipment or the like.

The embodiments described hereinabove are further intended to explain best modes known of practicing the invention and to enable others skilled in the art to utilize the invention in such, or other embodiments and with various modifications required by the particular application(s) or use(s) of the invention. It is intended that the appended claims be construed to include alternative embodiments to the extent permitted by the prior art.

What is claimed is:

1. A method for use in shipping an apparatus for splitting logs, the method comprising:
  providing a log splitting apparatus for splitting logs that includes:
    a log splitter frame having first and second opposite ends, a longitudinal axis extending along a length of the log splitter frame between the first and second opposite ends, and an upper portion for receiving a log to be split with the log splitting apparatus;
    a stop member rigidly attached to and extending away from the upper portion of the log splitter frame for providing an opposing force against a log being pushed against the stop member by a splitting assembly that is linearly translatable over the upper portion of the log splitter frame for use in splitting a log received over the upper surface;
    a trailer connected to the log splitter frame for supporting the log splitter frame and facilitating transport of the log splitter frame, wherein the trailer includes a wheel and axle assembly, and wherein the wheel and axle assembly includes first and second wheels that are interconnected by an axle assembly and are rotatable about a rotation axis; and
    a pump and motor assembly attached to the trailer for driving the splitting assembly over the upper portion of the log splitter frame;
  placing the log splitting apparatus onto a base, wherein the placing includes:
    positioning the stop member over and in contact with an upper surface of a first receiving portion of the base, wherein the upper surface of the first receiving portion is disposed in a first reference plane that is parallel to and is disposed a first distance from a horizontal reference plane passing through the base;
    positioning the pump and motor assembly over and in contact with an upper surface of a second receiving portion of the base, wherein the upper surface of the second receiving portion is disposed in a second reference plane that is parallel to and is disposed a second distance from the horizontal reference plane passing through the base, wherein the second distance is greater than the first distance, wherein the upper surfaces of the first and second receiving portions face in a common direction, and wherein the second receiving portion counteracts an asymmetrical weight distribution of the log splitting apparatus to inhibit rotation of the log splitter frame about the rotation axis and thereby maintain substantial verticality of the longitudinal axis of the log splitter frame on the base; and positioning the wheel and axle assembly over and in contact with an upper surface of a third receiving portion of the base, wherein the third receiving portion inhibits movement of the log splitting apparatus relative to the horizontal reference plane passing through the base; and positioning the base with the log splitting apparatus placed thereon into a resting position within a transport enclosure, wherein the longitudinal axis of the log splitter frame remains substantially vertical in the resting position of the log splitting apparatus, and wherein the transport enclosure is configured to be transported with the log splitting apparatus in the resting position.

2. The method of claim 1, wherein the first receiving portion constrains movement of the log splitter frame along a first axis that is perpendicular to the longitudinal axis of the log splitter frame.

3. The method of claim 2, wherein the first receiving portion constrains movement of the log splitter frame along a second axis that is perpendicular to the longitudinal axis of the log splitter frame, wherein the first and second axes are perpendicular.

4. The method of claim 1, wherein the stop member extends perpendicularly away from the upper portion of the log splitter frame.

5. The method of claim 1, wherein the third receiving portion includes a first movement restriction apparatus disposed adjacent a first side of the base and a second movement restriction apparatus disposed adjacent a second side of the base, wherein the first movement restriction apparatus includes first and second protruding members and a receiving depression disposed between the first and second protruding members, wherein the second movement restriction apparatus includes first and second protruding members and a receiving depression disposed between the first and second protruding members, and wherein the positioning the wheel and axle assembly includes:

locating a first portion of the wheel and axle assembly adjacent the first wheel within the receiving depression of the first movement restriction apparatus and locating a second portion of the wheel and axle assembly adjacent the second wheel within the receiving depression of the second movement restriction apparatus.

6. The method of claim 5, wherein the first and second protruding members of the first and second movement restriction apparatuses inhibit movement of the wheel and axle assembly in opposite first and second directions along a first axis that is parallel to the horizontal reference plane, wherein the first and second movement restriction apparatuses inhibit movement of the wheel and axle assembly in opposite first and second directions along a second axis that is parallel to the horizontal reference plane, and wherein the first and second axes are perpendicular.

7. The method of claim 2, wherein the base includes a framework that rigidly interconnects the first, second, and third receiving portions such that the first, second, and third receiving portions are non-movable relative to each other.

8. The method of claim 1, wherein the log splitting apparatus is a first log splitting apparatus, wherein the base is a first base, and wherein the method further includes:

providing a second log splitting apparatus for splitting logs;

placing the second log splitting apparatus onto a second base; and positioning the second base with the second log splitting apparatus located thereon into the resting position within the transport enclosure.

9. The method of claim 8, wherein the positioning the second base including at least partially nesting the second base with the first base.

10. The method of claim 8, further including:
nesting a portion of the second log splitting apparatus with a portion of the first log splitting apparatus.

11. The method of claim 1, further including:
moving the transport enclosure while the log splitting apparatus remains in its resting position on the base inside the transport enclosure.

12. The method of claim 11, further including after the moving the transport enclosure:

unloading the base with the log splitting apparatus placed thereon from the transport enclosure; and moving the base with the log splitting apparatus placed thereon from the transport enclosure to another location.

13. The method of claim 12, wherein the other location is at a retailer.

14. The method of claim 1, wherein the trailer includes a support beam interconnected to the axle assembly between the first and second ends of the axle assembly, wherein the support beam includes a longitudinal axis, and wherein the longitudinal axis of the support beam is substantially vertical in the resting position of the log splitting apparatus.

15. The method of claim 10, wherein the nesting includes:
inserting the stop member of the second log splitting apparatus under a portion of the pump and motor assembly of the first log splitting apparatus.

16. A method for use in shipping an apparatus for splitting logs, the method comprising:

providing a log splitting apparatus for splitting logs that includes:

a log splitter frame having first and second opposite ends, a longitudinal axis extending along a length of the log splitter frame between the first and second opposite ends, and an upper portion for receiving a log to be split with the log splitting apparatus;

a stop member rigidly attached to and extending away from the upper portion of the log splitter frame for providing an opposing force against a log being pushed against the stop member by a splitting assembly that is linearly translatable over the upper portion of the log splitter frame for use in splitting a log received over the upper surface;

a trailer connected to the log splitter frame for supporting the log splitter frame and facilitating transport of the log splitter frame, wherein the trailer includes a wheel and axle assembly, and wherein the wheel and axle assembly includes first and second wheels that are interconnected by an axle assembly and are rotatable about a rotation axis; and a pump and motor assembly attached to the trailer for driving the splitting assembly over the upper portion of the log splitter frame;

placing the log splitting apparatus onto a base, wherein the placing includes:

inhibiting movement of the log splitting apparatus within a horizontal reference plane passing through the base and wherein the inhibiting includes positioning the wheel and axle assembly over a first receiving portion of the base that inhibits movement of the wheel and axle assembly relative to the horizontal reference plane passing through the base; and counteracting an asymmetrical weight distribution of the log splitting apparatus relative to the horizontal reference plane and thereby maintain substantial verticality of the longitudinal axis of the log splitter frame on the base; and positioning the base with the log splitting apparatus placed thereon into a resting position within a transport enclosure, wherein the longitudinal axis of the log splitter frame remains substantially vertical in the resting position of the log splitting apparatus, and wherein the transport enclosure is configured to be transported with the log splitting apparatus in the resting position.

17. The method of claim 16, wherein the first receiving portion includes a first movement restriction apparatus disposed adjacent a first side of the base and a second movement restriction apparatus disposed adjacent a second side of the base, wherein the first movement restriction apparatus includes first and second protruding members and a receiving depression disposed between the first and second protruding members, wherein the second movement restriction apparatus includes first and second protruding members and a receiving depression disposed between the first and second protruding members, and wherein the positioning the wheel and axle assembly includes:

locating a first portion of the wheel and axle assembly adjacent the first wheel within the receiving depression of the first movement restriction apparatus and locating a second portion of the wheel and axle assembly adjacent the second wheel within the receiving depression of the second movement restriction apparatus.

18. The method of claim 17, wherein the first and second protruding members of the first and second movement restriction apparatuses inhibit movement of the wheel and axle assembly in opposite first and second directions along a first axis that is parallel to the horizontal reference plane, wherein the first and second movement restriction apparatuses inhibit movement of the wheel and axle assembly in opposite first and second directions along a second axis that is parallel to the horizontal reference plane, and wherein the first and second axes are perpendicular.

19. The method of claim 17, wherein the counteracting includes:

contacting the stop member with an upper surface of a first portion of the base.

20. The method of claim 19, wherein the counteracting includes:

contacting the pump and member with an upper surface of a second portion of the base, wherein the upper surfaces of the first and second portions of the base are different distances from the horizontal reference plane.

21. The method of claim 16, wherein the counteracting includes:

contacting the stop member with an upper surface of a first portion of the base.

22. The method of claim 21, wherein the counteracting includes:

contacting the pump and member with an upper surface of a second portion of the base, wherein the upper surfaces of the first and second portions of the base are different distances from the horizontal reference plane.

23. A method, comprising:

providing first and second log splitting apparatuses for splitting logs, wherein each of the first and second log splitting apparatuses includes:

a log splitter frame having first and second opposite ends, a longitudinal axis extending along a length of the log splitter frame between the first and second opposite ends, and an upper portion for receiving a log to be split;

a stop member rigidly attached to and extending away from the upper portion of the log splitter frame for providing an opposing force against a log being pushed against the stop member by a splitting assembly that is linearly translatable over the upper portion of the log splitter frame for use in splitting a log received over the upper surface;

a trailer connected to the log splitter frame for supporting the log splitter frame and facilitating transport of the log splitter frame, wherein the trailer includes a wheel and axle assembly, wherein the wheel and axle assembly includes first and second wheels that are interconnected by an axle assembly and are rotatable about a rotation axis; and a pump and motor assembly attached to the trailer for driving the splitting assembly over the upper portion of the log splitter frame;

placing the first log splitting apparatus onto a first based;

placing the second log splitting apparatus onto a second base;

positioning the first base with the first log splitting apparatus placed thereon into a resting position within a transport enclosure, wherein the first base counteracts an asymmetrical weight distribution of the first log splitting apparatus to inhibit rotation of the log splitter frame about the rotation axis and thereby maintain substantial verticality of the longitudinal axis of the log splitter frame on the first base;

positioning the second base with the second log splitting apparatus placed thereon into a resting position within a transport enclosure, wherein the second base counteracts an asymmetrical weight distribution of the second log splitting apparatus to inhibit rotation of the log splitter frame about the rotation axis and thereby maintain substantial verticality of the longitudinal axis of the log splitter frame on the second base; and nesting the second log splitting apparatus with the first log splitting apparatus, wherein the nesting includes inserting the stop member of the second log splitting apparatus under a portion of the pump and motor assembly of the first log splitting apparatus.

24. The method of claim 23, further including:

nesting the second base with the first base, wherein the nesting includes inserting the second base within a portion of the first base.

* * * * *

UNITED STATES PATENT AND TRADEMARK OFFICE
CERTIFICATE OF CORRECTION

PATENT NO. : 10,023,093 B2
APPLICATION NO. : 15/430201
DATED : July 17, 2018
INVENTOR(S) : Banjo et al.

Page 1 of 1

It is certified that error appears in the above-identified patent and that said Letters Patent is hereby corrected as shown below:

In the Claims

Column 18, Line 31, delete "a first based;" and insert therefore --a first base;--

Signed and Sealed this
Sixteenth Day of October, 2018

Andrei Iancu
*Director of the United States Patent and Trademark Office*